United States Patent [19]
Karls

[11] 4,060,706
[45] Nov. 29, 1977

[54] METHOD OF FORMING A HANDLE BY WELDING

[75] Inventor: Albert J. Karls, Greenville, Miss.

[73] Assignee: Moeller Manufacturing Company, Inc., Greenville, Miss.

[21] Appl. No.: 540,174

[22] Filed: Jan. 10, 1975

[51] Int. Cl.² .............................................. B23K 11/02
[52] U.S. Cl. ....................................... 219/107; 219/58; 219/91
[58] Field of Search ...................... 219/91, 93, 94, 107, 219/117 R, 58, 80, 119

[56] References Cited

U.S. PATENT DOCUMENTS

| Re. 21,921 | 10/1941 | Greulich | 219/107 X |
| 1,522,888 | 1/1925 | Johnson | 219/119 X |
| 3,226,803 | 1/1966 | Samuels | 219/58 X |
| 3,251,127 | 5/1966 | Tonelli | 219/107 X |
| 3,566,008 | 2/1971 | Ettlinger et al. | 219/117 X |

FOREIGN PATENT DOCUMENTS

| 123,269 | 8/1958 | U.S.S.R. | 219/107 |

Primary Examiner—J. V. Truhe
Assistant Examiner—N. D. Herkamp
Attorney, Agent, or Firm—Berman, Aisenberg & Platt

[57] ABSTRACT

A technique for forming and mounting a handle which includes the steps of providing a channel-shaped body of metal with opposed flat lugs at its midportion, inserting a metal rod perpendicularly into the channel-shaped body in tangential surface contact with the inside surfaces of the lugs and in abutment with the inside wall surface or web of the body, mounting these interengaging parts horizontally in a holding jig provided adjacent the stationary lower electrode of an electric welder with the bottom lug engaged on the electrode, and lowering the other welding electrode into contact with the upper lug, so as to weld the lugs to the opposite sides of the rod at the tangential contact surfaces.

10 Claims, 7 Drawing Figures

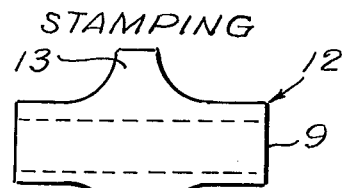
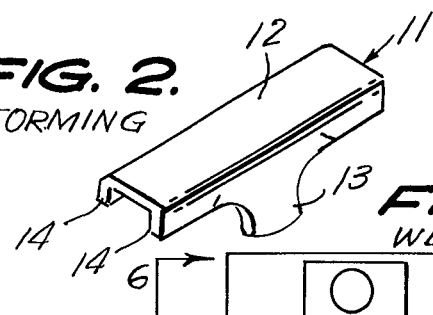
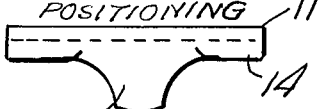
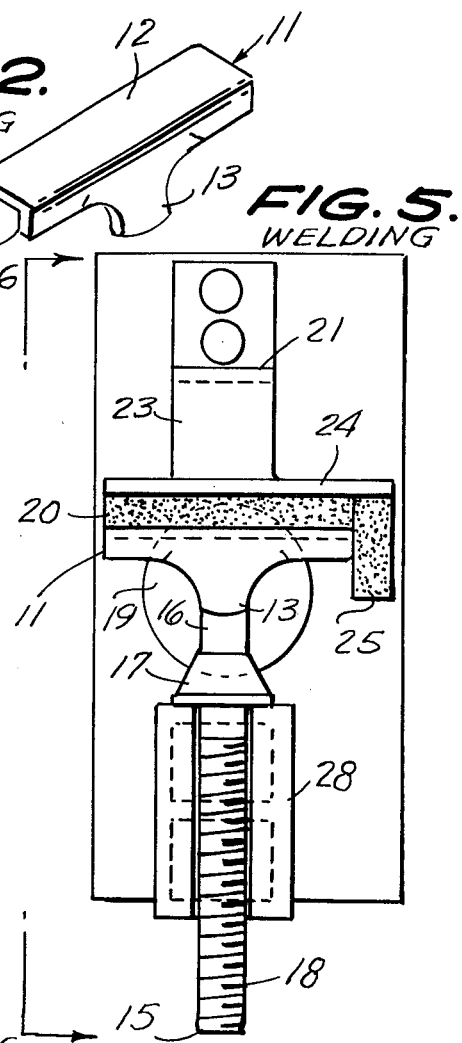
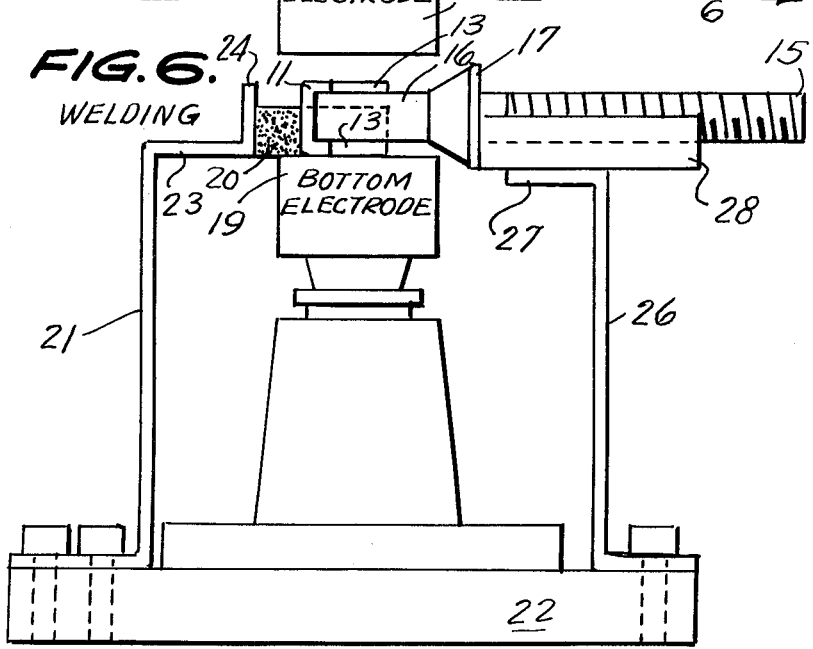
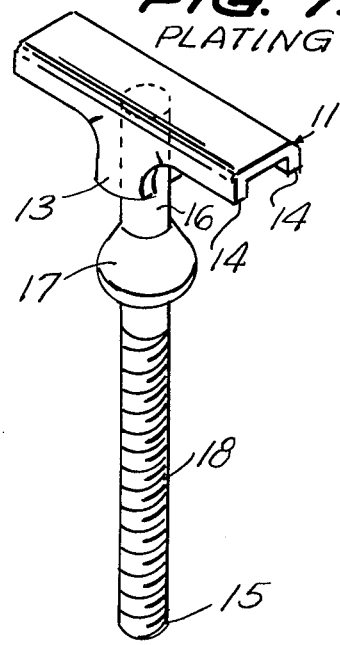

METHOD OF FORMING A HANDLE BY WELDING

This invention relates to handles for closure plugs and other devices, and more particularly to improvements in fabricating such handles.

A main object of the invention is to provide a novel and improved technique for forming handles of the type comprising a crosspiece attached to a rod or stud; the technique involving relatively simple procedural steps, being easy to perform, and providing a greatly improved final product as compared with those formed by previously known techniques.

A further object of the invention is to provide a method for forming a handle of the type comprising a crosspiece and a stem or stud, suitable for use with closure plugs and other devices; the technique providing economical utilization of material, requiring no projections for welding to be provided on the stem or stud, and permitting very fast assembly of the stem and crosspiece.

A still further object of the invention is to provide an improved method of attaching a crosspiece to a stem in forming a handle for a closure plug or other device, wherein no welding projection is required on the stem, and wherein the stem can be in any rotated position relative to the crosspiece and can still be securely welded to the crosspiece.

A still further object of the invention is to provide an improved method for welding the cross bar element of a handle to the associated stem or stud without the necessity of carefully positioning the stem relative to the crosspiece and without requiring the provision of welding projections on the stem.

A still further object of the invention is to provide an improved method of forming a T-shaped handle of the type comprising a channel-shaped gripping portion and a stem or stud secured perpendicularly thereto; the method involving relatively simple steps, requiring inexpensive apparatus for performing same, and being capable of performance rapidly and with minimum effort, whereby to keep the costs involved to a minimum.

A still further object of the invention is to provide an improved method of forming a T-shaped handle for a closure plug or similar device, without the necessity of drilling holes, employing securing pins, or specially forming the stem with welding projections; the method being capable of being performed by relatively unskilled personnel and providing a final product of high strength and reliability.

Further objects and advantages of the invention will become apparent from the following description and claims, and from the accompanying drawings, wherein:

FIG. 1 is a plan view showing a blank formed to eventually become a crosspiece or gripping member in a T-shaped handle fabricated in accordance with the present invention.

FIG. 2 is a perspective view showing the blank of FIG. 1 formed into a channel in accordance with the present invention.

FIG. 3 is an end elevational view showing the channel of FIG. 2 arranged for interengagement with a handle stem member to be secured thereto according to the present invention.

FIG. 4 is a front elevational view of the channel member and stem element shown in FIG. 3.

FIG. 5 is a top plan view of the interengaged channel member and stem element of FIGS. 3 and 4, shown positioned in a welding jig provided adjacent the bottom electrode of an electric welder.

FIG. 6 is an elevational view taken substantially on line 6—6 of FIG. 5.

FIG. 7 is a perspective view of a completed closure plug handle formed by the steps illustrated in FIGS. 1 to 6.

T-shaped handles have been employed for many years with closure plugs or the like, as will be seen in U.S. Pat. Nos. 3,295,712 and 3,349,944. Such handles are of the type having a threaded shank engagable with a nut or other threaded element, and are employed with an expansible plug element. In this type of closure plug, the expansible body is expanded by rotating the associated stem, and the stem is provided with a cross bar or gripping portion to enable the stem to be thus rotated. Prior to my invention disclosed herein, portions of the T-shaped handle were heretofore formed by others in various ways; for example, by using drilled holes and pins to secure the cross bar to the stem (as shown in FIGS. 1 and 2 of U.S. Pat. No. 3,349,944), by press fitting a square extension on the end of the stem into a square slot in the web of a channel-shaped cross member and then spreading the protruding part of the extension to attach the stem to the cross member (as shown in FIG. 4 of U.S. Pat. No. 3,349,944). Also prior to my invention disclosed herein and during my experiments resulting in such invention, portions of the T-shaped handle were heretofore formed by me in various ways; for example, by providing raised projections on the stem and connecting the stem to a channel-shaped cross member by a conventional projection welding process. In such process, the stem must be rotationally accurately positioned relative to the cross bar or member prior to welding to be certain that the stem projections will properly contact the cross bar or member in order to ensure fusion by welding. Thus, in the previous methods discussed above to form welded T-shaped handles, there has always been the necessity of properly rotationally positioning the stem relative to the cross bar or member before welding, and of providing the stem with welding projections to provide the required welded joints. The necessity of properly orienting the stem relative to the handle involves substantial delay in production as well as close attention by the operator in positioning the stem relative to the handle prior to welding. The present invention aims to eliminate this necessity of accurately orienting the stem relative to the cross bar portion of a handle and for providing welding projections on the stem.

The present invention further aims to employ a technique which greatly speeds up production and which does not require a high degree of attention in performing the actual welding operation.

Another important objective of the present invention is to provide a resultant handle wherein the weld is properly distributed and which extends over substantial areas so as to provide a strong and reliable rigid connection between the cross bar elements and the stem portion. As will be readily understood, it is of highest importance for the cross bar element to be securely and rigidly connected to the stem element to withstand substantial torque since in a closure device of the type employing such a T-shaped handle, the handle must develop a substantial force on the end plates of the plug to cause the associated plug of substantial size to expand into tight sealing contact with a closure wall. Also, a considerable amount of torque must be applied to the T-shaped handle to turn it in a direction to release the associated closure plug.

Referring to the drawings, FIG. 1 shows a blank which is eventually formed to define a channel-shaped cross bar element, such as that designated generally at 11 in FIG. 2. The blank, shown at 12, comprises an originally flat rectangular sheet of suitable weldable metal, stamped to form two opposed flat lugs 13, 13 projecting from the midportions of the opposite side edges of the main body portion of the blank, as is clearly shown in FIG. 1.

The blank 12 is then formed by a suitable forming device into a channel having a web 9 and side flanges 14, 14 with the lugs 13, 13 extending parallel to each other.

Designated at 15 in FIGS. 3 and 4 is a stem member having a cylindrical top portion 16 dimensioned to closely engage between the lugs 13, 13 so as to make tangential surface contact with the inside surfaces of the lugs when inserted therebetween perpendicularly to the main body portion 12 of the cross bar 11. The stem member 15 is provided immediately below the cylindrical top portion 16 with a frusto-conical abutment collar 17 and with threads 18 extending along the portion of stem 15 below collar 17. In the procedure according to the present invention, the cylindrical portion 16 is inserted between the lugs 13, 13 and brought substantially into abutment with the web 9 of the main body 12 of the cross bar member 11, after which the interengaged parts are placed on the bottom electrode 19 of a conventional electric welder with the cross bar portion received against ceramic blocks 20 and 25 forming part of a fixture assembly provided on the welder, and stem 15 is received in a trough member 28.

As shown in FIGS. 5 and 6, the positioning jig or fixture assembly comprises a main bracket 21 secured to the base portion 22 of the electric welder and rising vertically therefrom. The top end of the bracket 21 has a horizontal arm 23 formed with an upstanding vertical flange 24 extending transversely of the bottom welding electrode 19 with the main elongated ceramic block 20 rigidly secured thereto. Rigidly secured at one end of flange 24 is a ceramic block 25 which extends horizontally and at right angles to the main block 20. The blocks 20 and 25 define stop elements for properly positioning the cross bar member 11, during the welding procedure. Mounted on base member 22, opposite the bracket 21, is another vertically extending upstanding bracket 26 having a top horizontal arm 27 on which is secured the saddle or trough member 28 directed perpendicularly to block 20. The saddle 28 receives and supports the portion of stem member 15 located below the collar element 17 when the cylindrical portion 16 is engaged between lugs 13, 13 as above described. From FIG. 5, it will be seen that the trough member 28 is properly located so as to be aligned with the space between the lugs 13, 13 when the cross member 11 is seated with its longitudinal face abutting main block 20 and with its end in abutment with the right angle block 25. In this position, the collar 17 is in engagement with the inner end of the trough member 28 so as to positively position the interengaged cross bar member 11 and stem member 15 for welding. With the parts thus positioned, the movable top electrode 29 of the welder is brought down to engage the top lug 13 to apply welding current through the top lug 13, the cylindrical stem portion 16 and the bottom lug 13. Welding fusion takes place at the tangential contacting surfaces of stem portion 16 and lugs 13, 13, and thus fusion occurs substantially over the entire length of tangential contact so as to form continuous welded joints between the top and bottom surfaces of stem portion 16 and the inside surfaces of respective lugs 13, 13.

After the above-described welding step has been performed, the resultant assembly is removed and may be suitably plated or otherwise protectively coated, to provide the final T-shaped handle assembly shown in FIG. 7.

It will be noted that in the above-described procedure, it is not necessary to rotationally position the stem 15 relative to the cross bar member 11, since the welds occur at any tangential surfaces between lugs 13, 13 and the cylindrical stem portion 16. Furthermore, it will be noted that it is unnecessary to provide welding projections on the portion 16 of stem 15 since the tangential engagement of portion 16 with the inside surfaces of lugs 13, 13 takes the place of the formerly required welding projections.

It will be recognized that this novel process may be economically performed because of factors such as permitting the use of an unskilled operator and the rapidity of assembly of the parts prior to welding. All that is necessary is for an operator to place the cross bar 11 in one hand and the stem 18 in the other. Then, the two units are brought together by inserting the stem into the channel-shaped cross bar without special attention and care to position the units relative to each other. The units are then easily dropped into the welding fixture whereupon the electrodes are activated to fuse the stem to the cross bar without the need to carefully position the stem rotationally with respect to the lugs 13, 13.

While a specific embodiment of an improved technique for forming and mounting a T-shaped handle has been disclosed in the foregoing description, it will be understood that this process may be applied to numerous assemblies and various modifications within the spirit of the invention that may occur to those skilled in the art. Therefore, it is intended that no limitations be placed on the invention except as defined by the scope of the appended claims.

What is claimed is:

1. A method of forming and mounting a handle comprising the steps of:
   a. Providing a flat sheet of weldable metal with narrow, opposed imperforate flat lugs projecting from the midportions of the opposite side edges of the sheet;
   b. Forming the sheet into a channel with said lugs extending coplanar with the channel sides parallel to each other;
   c. Extending the end portion of a weldable cylindrical rod between said lugs perpendicularly to the channel to bring the end of the rod substantially into abutment with the web of the channel with diametrically opposite sides of the rod in tangential surface contact with the inside surfaces of the lugs; and
   d. Fusing the rod to said inside surfaces to form rigid bonds therewith.

2. The method of claim 1, and wherein the fusion of the rod to said inside surfaces is performed by passing welding current through the lugs and the intervening rod.

3. The method of claim 1, and holding the channel and rod in a stationary fixture maintaining the rod in perpendicular relation to the channel while the rod is fused to said inside surfaces.

4. The method of claim 3, and supporting the interengaged channel and rod on a bottom, flat, welding electrode with one lug in engagement with the bottom electrode while a movable, flat upper welding electrode is lowered into contact with the other lug.

5. The method of claim 4, and engaging a portion of the rod to hold it in inserted relation between the lugs while the rod is fused to said inside surfaces.

6. The method of claim 4, wherein the channel formed in step (b) is of U-shaped cross-section and said parallel lugs extend from the channel walls, and wherein upon completion of the welding step the handle comprising the channel and rod fused thereto have a T-shaped configuration.

7. A method of mounting a cross bar on a stem comprising the steps of:
 a. Forming the cross bar with a pair of spaced substantially flat imperforate lugs projecting therefrom;
 b. Inserting a cylindrical stem between said lugs and establishing tangential lineal contact of said stem with said lugs;
 c. Fusing said stem to said lugs by passing welding current through said lugs and stem.

8. The method of claim 7 wherein said cross bar is formed into a channel and the lugs project laterally therefrom. pg,12

9. The method of claim 8 wherein the inserting step continues until the end of the stem abuts of the web of said channel.

10. The method of claim 7 and holding the cross bar and stem in a substantially perpendicular relationship during the fusing step.

* * * * *